United States Patent Office 3,634,503
Patented Jan. 11, 1972

3,634,503
PURIFICATION OF POLY(MALEIC ACID)
William G. Bowman, Pasadena, Tex., assignor to Petro-Tex Chemical Corporation, Houston, Tex.
No Drawing. Filed May 13, 1969, Ser. No. 824,286
Int. Cl. C07c 51/42
U.S. Cl. 260—537 R
5 Claims

ABSTRACT OF THE DISCLOSURE

The undesirable coloration of poly(maleic acid) can be reduced by treating an aqueous solution of the poly(maleic acid) with 1–15 weight percent hydrogen peroxide at a temperature in the range of 50–200° C. for ¼–2 hours. The resulting product has a much lighter color and has greater aesthetic appeal and technical utility, for example, in the area of textile finishes.

BACKGROUND OF THE INVENTION

The present invention relates to poly(maleic acid), more particularly the invention is a process for improving the color of poly(maleic acid).

Until relatively recently it was a well established concept in polymer chemistry that maleic anhydride could not be homopolymerized to form maleic anhydride homopolymers, although the copolymers of maleic anhydride with such monomers as ethylene, propylene, vinyl acetate, isobutylene, vinyl chloride, butadiene, styrene and the like have been known for a considerable period. However, J. P. S. Lang, et al., in Journal of Polymer Science, vol. I, pp. 1123–1136 (April 1963) disclosed that maleic anhydride can be homopolymerized by exposure to gamma radiation ($Co^{60}$) over extended periods of time. This article also disclosed that maleic anhydride homopolymerization can be achieved using free radial initiators such as dibenzol peroxide. Some other free radial initiators that have been found are lauroyl peroxide, $\alpha,\alpha'$-azobisisobutyronitrile, acetyl peroxide and the like.

In the procedure for homopolymerizing maleic anhydride acetyl peroxide is the initiator. About 0.5 to 8 weight percent of acetyl peroxide, based on the weight of maleic anhydride, is added to the maleic anhydric either in solution or as a melt. The reaction temperature is in a range of 55 to 150° C. Especially good results are obtained if the acetyl peroxide is employed in the range of about 2 to 6 weight percent based on maleic anhydride and the reaction temperature is maintained in the range of about 70 to 130° C. The reaction is exothermic and the temperature is maintained by using a suitable temperature bath. Whether it is an oil bath, water bath or otherwise, it should be capable of cooling as well as heating because it often becomes necessary after the polymerization reaction has begun to cool the reacting mixture to maintain the proper temperature.

When a melt procedure is employed it is convenient in small batches, i.e. less than 50 grams, to melt the maleic anhydride, place it in a dry reaction vessel, adjust the temperature to that desired by an oil bath or other suitable means at which time the proper amount of acetyl peroxide is added. For larger batches the melt procedure is carried out best by crushing the maleic anhydride, adding the acetyl peroxide thereto in a suitable reaction vessel, for example, a flask equipped with a thermometer and a mechanical stirrer which is heated to the desired temperature in a water bath and maintained at this temperature throughout the polymerization.

A solvent can be used for the polymerization. Typically temperature control is somewhat easier when a solvent is employed. Generally, a suitable solvent is one in which the maleic anhydride, catalyst and polymer product are soluble and which is inert, or substantially so, in the reaction. There are a number of solvents that have been employed in the reaction. These include acetic acid, acetic anhydride, 1,4-dioxane, o-dichlorobenzene, monochlorobenzene, n-nonane, 4-butyrolacetone and the like.

The molecular weight of the poly(maleic anhydride) has as a rule been rather difficult to accurately measure. Depending on the technique employed, a single sample has been described variously as having a molecular weight of 300 to 1000 (cryoscopic); 3,500 to 7,000 (ultracentrifugal); and 30,000–50,000 (light scattering).

The poly(maleic anhydride) can be easily converted to poly(maleic acid) by dissolving the anhydride polymer in water.

Metallic salts of the poly(maleic acid) can be produced by numerous acid-salt conversion reactions which are well-known in the art. One method involves dissolving poly(maleic anhydride) in water, and heating it from 90 to 100° C. for about one-half hour; neutralizing the aqueous poly(maleic acid) thus obtained with an alkali solution, for example, NaOH, up to a pH of 10.0; heating on a steam bath for 3 to 4 hours; and readjusting the pH to about 10.0. The solid alkali metal (in this case, sodium) polymaleate can be recovered from solution by any of several conventional methods, such as filtration, evaporation, freeze-drying, or precipitation. The precipitation is obtained by pouring the sodium polymaleate into an agitated non-solvent such as methanol or ethanol. The solid poly(maleic acid) is recovered in the same manner as the metal salt thereof.

Poly(maleic anhydride) or derivatives thereof are useful for a number of important purposes. For example, poly(maleic acid) and the water-soluble salts thereof are excellent chelating agents and show special utility as chemical intermediates, as additives to other polymer systems, as textile chemicals and have been found very useful for the surface treatment of metals.

It has generally been found that the product resulting from the polymerization of maleic anhydride has a color ranging from light tan through black with the majority of polymers being tan through reddish brown in color. The poly(maleic acid) derived from these polyanhydrides is similarly colored. It has been found possible to produce very lightly colored poly(maleic anhydride) by the use of a chlorinated benzene solvent for carrying out the polymerizations. However, on hydrolyzing these lightly colored polyanhydrides as described above, the poly(maleic acid) becomes darker in color, i.e., tan through reddish-brown. Thus, regardless of the method employed the useful form of polymer, i.e. the acid or metal salt thereof, is heavily colored. This coloration presents both aesthetic and technical drawbacks to the utilizations of the polymers of maleic anhydride. The present invention provides a method of improving the color of poly(maleic acid) as described below. By the term "improving the color" is meant herein the removal or deduction of coloration of the poly(maleic acid). For the purpose of the present invention the soluble salts of poly(maleic acid) are substantially equivalent to poly(maleic acid).

DESCRIPTION OF THE INVENTION

Briefly stated the present invention is a process for improving the color of poly(maleic acid) comprising contacting poly(maleic acid) in an inert polar solvent with 1 to 15 weight percent of hydrogen peroxide at a temperature in the range of 50–200° C.

The poly(maleic anhydride) resulting from the polymerizations is converted to poly(maleic acid) by dissolving the polyanhydride in water. This is typically achieved at 20 to 100° C. It is convenient to employ a water solution for the $H_2O_2$ treatment of the poly acid although not absolutely necessary. Any inert polar solvent can be used. By the term "inert . . . solvent" is meant a solvent which is inert or substantially inert to hydrogen peroxide or which is oxided to an inert or substantially inert form by hydrogen peroxide. Thus, some acceptable solvents in addition to water are 1,2-dimethoxyethane, acetone, tetrahydrofuran, acetic acid, propionic acid, benzoic acid and the like.

The dissolved poly(maleic acid) is treated with 1 to 15 weight percent of $H_2O_2$ based on the total weight of solution. The solution will contain typically 3 to 25 weight percent of poly(maleic acid) based on total solution, more preferably 5 to 15 weight percent on the same basis. The $H_2O_2$ treatment is carried out at a temperature in the range of 50–200° C., more preferably 60–110° C. and conveniently at reflux. Normally, atmospheric pressure is employed though either sub- or superatmospheric pressures are acceptable. Superatmospheric pressure, i.e. 2–10 atmospheres, may be desirable at higher treatment temperatures. Treatment times are determined by the appearance of the solution, i.e. when the color is removed or substantially so, the treatment is terminated, usually about 15 minutes to 2 hours.

The following examples are presented to further illustrate the invention. Various reaction products have been identified by infrared.

EXAMPLE 1

Fifty grams of maleic anhydride were dissolved in 50 ml. of monochlorobenzene at room temperature (25° C.) using a high speed stirrer (20,000 r.p.m.). To this solution 10 ml. of 25 percent acetyl peroxide (2.5 grams in 10 ml. of dimethylphthalate—commercially available) were added with continued stirring. The reaction mixture was heated at 78° C. with stirring to initiate the polymerization. The temperature was maintained for 45 minutes at 78° C. by heating at which time the reaction became exothermic and the temperature rose to 103° C. The reaction was continued for an additional hour and 15 minutes. The heat input remained constant during this time. The final temperature was 120° C. The reaction mixture was removed from the heat. The product at this point was a dark brown, friable mass which was easily separated from the solvent by filtration. The product was dissolved in 200 ml. of 1,2-dimethoxyethane and reprecipitated by slowly pouring the solution into one liter of toluene in a rapidly stirred Waring Blender. Solids were formed in suspension and were recovered by filtering and subsequent air drying. The product, poly (maleic anhydride), was 34.0 grams of off white powder.

10 grams of the poly(maleic anhydride) dissolved in 150 ml. of distilled water at about 70° C. produces a brownish solution. Evaporation of the water leaves about 10 grams of brownish crystalline material, the poly (maleic acid).

10 grams of the poly(maleic anhydride) product was dissolved in 150 ml. of distilled water at room temperature (25° C.). The solution had a brownish coloration. To this solution 10 ml. of 30 percent hydrogen peroxide was added and the temperature of the mixture raised slowly to reflux (approximately 100° C.). The mixture was refluxed for 30 minutes. The reaction mixture was then heated at 70–80° C. until the solution became very thick. It was then placed in an oven and dried at 110–120° C. The dried poly(maleic acid) was powdered and yielded about 7.5 grams of cream-colored powder.

EXAMPLE 2

Ten milliliters of 25 percent acetyl peroxide in dimethylphthalate were added to 50 grams of molten maleic anhydride. The mixture was slowly raised to 75° C. with stirring. The reaction was exothermic and heat was removed to hold the temperature below 75° C. during the early period of the reaction. The reaction was run for a total of 3 hours. Heat was removed so that the maximum temperature was 94° C. Evolution of gas was noted. The product at this point was a brown, friable mass.

One hundred and fifty milliliters of 1,2-dimethoxyethane were added to the reaction flask. All of the material dissolved. The solution was poured into 700 ml. of toluene at room temperature (25° C.) with stirring. A flocculent precipitate was formed, which was filtered and slurried with warm (50° C.) toluene and refiltered to give 45 grams of clear yelowish poly anhydride, a portion of which on solution in distilled water at 25° C. gives a brownish coloration and yields a brownish solid poly(maleic acid) on evaporation of the water.

However, 10 grams of colored poly acid dissolved in 150 ml. of distilled water with 10 ml. of 30 percent $H_2O_2$ and refluxed for one hour gives a white powder (about 9 grams) after evaporation of the water.

The invention claimed is:
1. In a process for preparing poly(maleic acid) or the soluble metal salts thereof comprising:
 (A) homopolymerizing maleic anhydride in the presence of a free radical initiator to produce poly (maleic anhydride),
 (B) recovering the poly(maleic anhydride),
 (C) dissolving the poly(maleic anhydride) in an aqeous solution to produce poly(maleic acid) or the soluble metal salts thereof wherein the improvement comprises improving the color of the poly(maleic acid) or soluble metal salts thereof by contacting a solution comprising 3 to 25 weight percent poly (maleic acid) or soluble metal salts thereof, based on total weight of solution in an inert polar solvent with 1 to 15 weight percent of hydrogen peroxide based on total weight of solution at a temperature in the range of 50 to 200° C.
2. The process according to claim 1 wherein the polar solvent is water.
3. The process according to claim 2 wherein there is 5 to 15 weight percent of the poly(maleic acid).
4. The process according to claim 1 wherein the temperature is in the range of 60 to 110° C.
5. The process according to claim 4 wherein the temperature is at reflux.

References Cited
UNITED STATES PATENTS 1,914,556  6/1933  Conover _____ 260—537

LORRAINE A. WEINBERGER, Primary Examiner

V. GARNER, Assistant Examiner

U.S. Cl. X.R.
260—346.8